United States Patent [19]
Herpel et al.

[11] Patent Number: 5,422,676
[45] Date of Patent: Jun. 6, 1995

[54] SYSTEM FOR CODING AN IMAGE REPRESENTATIVE SIGNAL

[75] Inventors: Carsten Herpel; Heinz-Werner Keesen, both of Hanover, Germany

[73] Assignee: Deutsche Thomson-Brandt GmbH, Villengen-Schwenningen, Germany

[21] Appl. No.: 141,804

[22] Filed: Oct. 22, 1993

[30] Foreign Application Priority Data

Apr. 25, 1991 [DE] Germany ............... 41 13 505.9

[51] Int. Cl.$^6$ ............... H04N 7/133; H04N 7/137
[52] U.S. Cl. ............... 348/420; 348/407
[58] Field of Search ............... 348/400, 407, 420; H04N 7/133, 7/137

[56] References Cited

U.S. PATENT DOCUMENTS

| | | | |
|---|---|---|---|
| 4,849,812 | 7/1989 | Borgers et al. | 348/400 |
| 5,091,782 | 2/1992 | Krause et al. | 348/400 |

FOREIGN PATENT DOCUMENTS

| | | |
|---|---|---|
| 262555 | 9/1987 | European Pat. Off. |
| 290085 | 4/1988 | European Pat. Off. |
| 1381730 | 3/1988 | U.S.S.R. |

OTHER PUBLICATIONS

W. Jass et al., "A Hybrid DCT-Coder with Local Adaptivity for the Interlaced HDTV-Transmission with 140 Mbit/s", Proceedings of the SPIE Image Processing Algorithms and Techniques, Feb. 12-14, 1990, pp. 378-388.

R. Kutra, Block Adaptive Frame/Field DCT Coding Decided by the Vertical Difference Test, Proceedings of the Third International Workshop on HDTV, Aug. 30-Sep. 1, 1989, pp. 739-748.

P. Vogel, Videobild auf der Datenleitung, Funkschau, vol. 60, No. 26, Dec. 16, 1988, pp. 60-63.

DeWith, P. H. N., Motion-Adaptive Intraframe Transform Coding of Video Signals, Philips Journal of Research, vol. 44, No. 2/3, pp. 345-364, FIG. 3.

Ericsson, S., Fixed and Adaptive Predictors for Hybrid Predictive/Transform Coding, IEEE Transactions on Communications, vol. COM-33, No. 12, Dec. 1985.

Kamangar, F. A. et al., Interfield Hybrid Coding of Component Color Television Signals, IEEE Transactions on Communications, vol. COM-29, No. 12, Dec. 1981, pp. 1740-1753.

Progressive Picture Transmission Using Interleaved Blocks, Electronics Letters, 5 Dec. 1985, vol. 21, No.25/26, pp. 1181-1182, FIG. 1.

*Primary Examiner*—Howard W. Britton
*Attorney, Agent, or Firm*—Joseph S. Tripoli; Eric P. Herrmann; Ronald H. Kurdyla

[57] ABSTRACT

A hybrid Discrete Cosine Transform (DCT) coder processes blocks of (e.g., 8×8) pixels from interlaced or progressive scanned image signals. Processing of image lines by the coder is modified in the presence of image motion to avoid switching between 8×8 and 2×(4×8) transformations. For motion, the lines of two vertically superimposed image blocks are rearranged to produce first and second modified blocks. The modified first block contains pixels from lines in a first field, and the modified second block contains pixels from lines in an associated adjacent second field.

10 Claims, 3 Drawing Sheets

|  |  |  |  |  |  |  |  |
|---|---|---|---|---|---|---|---|
| 11 | 11 | 11 | 11 | 11 | 11 | 11 | 11 |
| 12 | 12 | 12 | 12 | 13 | 13 | 13 | 13 |
| 13 | 13 | 13 | 13 | 21 | 21 | 21 | 21 |
| 14 | 14 | 14 | 14 | 23 | 23 | 23 | 23 |
| 21 | 21 | 21 | 21 | 12 | 12 | 12 | 12 |
| 22 | 22 | 22 | 22 | 14 | 14 | 14 | 14 |
| 23 | 23 | 23 | 23 | 22 | 22 | 22 | 22 |
| 24 | 24 | 24 | 24 | 24 | 24 | 24 | 24 |

FIG.1a   FIG.1b

SYSTEM FOR CODING AN IMAGE REPRESENTATIVE SIGNAL

This is a continuation of PCT application PCT/EP 92/00843 filed Apr. 14, 1992 by Carsten Herpel and Heinz-Werner Keesen titled "Process for Coding Picture Signals".

BACKGROUND OF THE INVENTION

This invention relates to a system for coding image signals such as by means of a DCT (Discrete Cosine Transform), for example.

A transformation circuit for facilitating an 8*8 or a 2*(4*8) DCT transformation is described in DE 36 42 664. Switching between an 8*8 and a 2*(4*8) DCT may be accomplished in response to the state of a logic level on a control line.

SUMMARY OF THE INVENTION

An object of the invention is to provide a system for coding image signals by means of a codec suitable for processing both progressively scanned and interlace scanned image signals.

In a system according to the present invention, before coding with a hybrid coder which can process blocks of progressively scanned picture elements (pixels), line sections from respective blocks of interlace scanned picture elements within two vertically superimposed blocks are arranged such that only line sections from one field of an image signal are contained within each of these blocks. Image motion is detected and the line sections are re-sorted within the superimposed blocks in the presence of dynamic image content.

According to a method for hybrid coding of image signals proposed by ISO-MPEG (International Organisation for Standardization, Motion Picture Expert Group) under Standard Proposal number ISO 11172, progressively scanned input signals are DCT processed in blocks, whereby respective blocks of 8*8 picture elements are coded or decoded and a sequence of interframe coded images is replaced as regular intervals by intra-frame coded images. The effectiveness of the coding is also a function of the relatively high spatial corelation of picture elements within such blocks. If interlaced source signals are to be processed by such a hybrid decoder, coding effectiveness decreases if dynamic image content or the data rate required for coding increases. This results because every second line derives from a block having different phases of motion, and correlation of picture elements within such a block decrease. In contrast, coding effectiveness is maintained in the presence of a static image. With a dynamic image, image lines associated with a first field from two superimposed 8*8 picture element blocks are now combined into a first 8*8 block, and lines associated with a corresponding second field from these two superimposed 8*8 picture element blocks are combined into a second 8*8 block, and are applied in this form to the hybrid coder.

Due to such reorganisation of the input signals, it is not necessary to switch between 8*8 and a 2*(4*8) DCT transformation in the hybrid coder as in DE 36 42 664. Instead, an 8*8 DCT can also be advantageously performed for a dynamic image.

A motion detector indicates whether a static or dynamic image is present, and re-sorting or addressing of the lines is done accordingly. Such motion information may be added to the coded data for the respective block by means of a bit per block or double block. During decoding, the corresponding lines are arranged in the original sequence whereby the motion information is evaluated. According to the MPEG standard, four luminance picture element blocks arranged in the shape of a square are combined into a macroblock. Advantageously, two of the superimposed blocks of such a macroblock form a pair in the above-mentioned sense. Accordingly, one bit per macroblock can indicate the re-sorting.

BRIEF DESCRIPTION OF THE DRAWINGS

FIG. 1 illustrates the location of image lines within blocks for static (a) and dynamic (b) images.

DETAILED DESCRIPTION

FIG. 1a and 1b respectively show two superimposed blocks of luminance or chrominance picture elements in the x-y plane. For simplicity of illustration, each block includes 4*4 picture elements instead of 8*8 picture elements. In general, the blocks could also have a size of $(2*n)*(2*m)$ where $n=1, 2, 3, \ldots$, $m=1, 2, 3, \ldots$, instead of 8*8. The two digit numbers respectively designate the spatial position of a picture element. The first digit of each number represents the block number, and the second digit represents the line number within a block.

The picture elements which are to be coded or decoded in progressively scanned form by a known hybrid coder are arranged as shown in FIG. 1a. This arrangement also applies for picture elements associated with static interlace scanned images. Before coding a dynamic image, the lines of two superimposed blocks are interchanged in accordance with FIG. 1b, and after decoding they are re-arranged in accordance with FIG. 1a.

Figure 2:
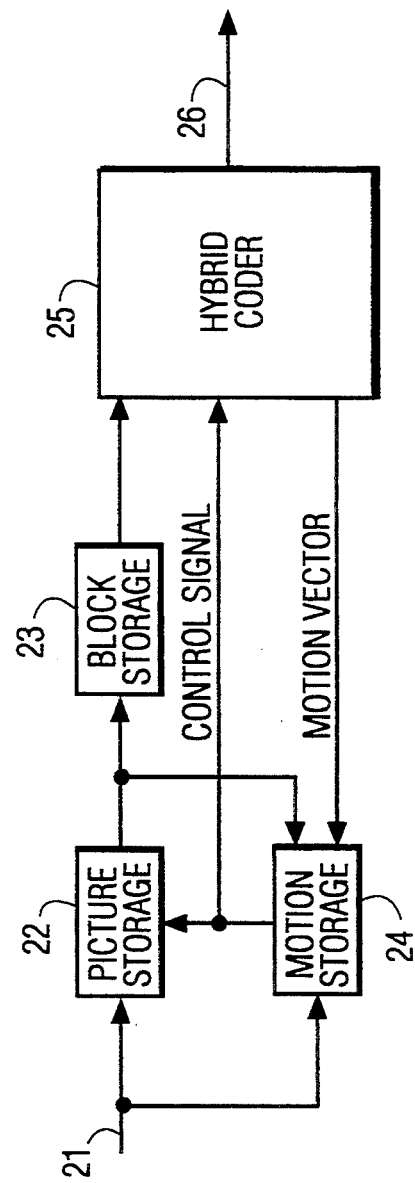
FIG. 2 is a block diagram codec apparatus in accordance with the invention.

FIG. 2 shows a known type of hybrid coder 25 for processing a signal according to the MPEG standard. An interlaced image signal from a picture n is supplied via an input 21 to inputs of a picture storage unit 22 and a motion detector 24. Items of data (two superimposed blocks) of a picture n-1, needed by motion detector 24, and the line sections of the respective two blocks involved, are read out from picture store 22 into a block storage unit 23. From unit 23 coder 25 selects 8*8 blocks on each occasion. Picture elements for static images corresponding to FIG. 1a, and those for dynamic images corresponding to FIG. 1b, are stored in a buffer in block storage unit 23.

Motion detector 24 can be implemented in accordance with various known methods. For example, the absolute value differences of picture elements from blocks having the same spatial position of picture n and picture n-1 may be formed for each block or double block that has to be coded. Alternatively, motion vectors (e.g., for two superimposed blocks on each occasion) formed by coder 25 can be used instead of the motion detector. Thus transform coder 25 may provide a Motion Vector to indicate a motion condition for rearranging the line structure of an interlaced signal. If the instantaneous sum of the absolute value differences, and/or the amount of the corresponding motion vectors for this block or these blocks, exceeds a predetermined threshold (i.e., dynamic picture content is present), the picture elements shown in FIG. 1b, otherwise those corresponding to FIG. 1a, are stored in unit 23. Otherwise, the picture elements shown in FIG. 1a are stored in unit 23. A Control Signal from motion detector 24 in FIG. 2 indicating the occurrence of a rearranged line structure may be provided to transform coder 25 for adding the control signal to be coded signal.

The described re-sorting operation may be performed in accordance with the following program:

```
       DO y = 1,N/2
         DO x = 1,N
           Bout1(x,y) = Bin1(x,2*y-1)
           Bout1(x,y) = Bin1(x,2*y)
         ENDDO
       ENDDO
       DO y = 1,N/2
         DO x = 1,N
           Bout1(x,y + N/2) = Bin2(x,2*y-1)
           Bout1(x,y + N/2) = Bin2(x,2*y)
         ENDDO
       ENDDO,
``` where $B_{in1}$ is the block located in the higher (upper) position and N is an even number.

Coder 25 may be a standard coder such as described in CCITT H.261, and in the MPEG standard ISO/IEC 11172-2. Integrated circuit coders of this type are commercially available (eg., GEC Plessey VP 2611 and SGS-Thomson STI3230). Unit 22 may include a standard frame storage device such as may be used for image processing, and unit 23 may include a standard Random Access Memory (RAM). As noted above, unit 24 may be a standard motion detector which operates by obtaining the absolute values of pixel block differences and comparing a sum of these values to a threshold to determine the presence or absence of motion.

Figure 3:
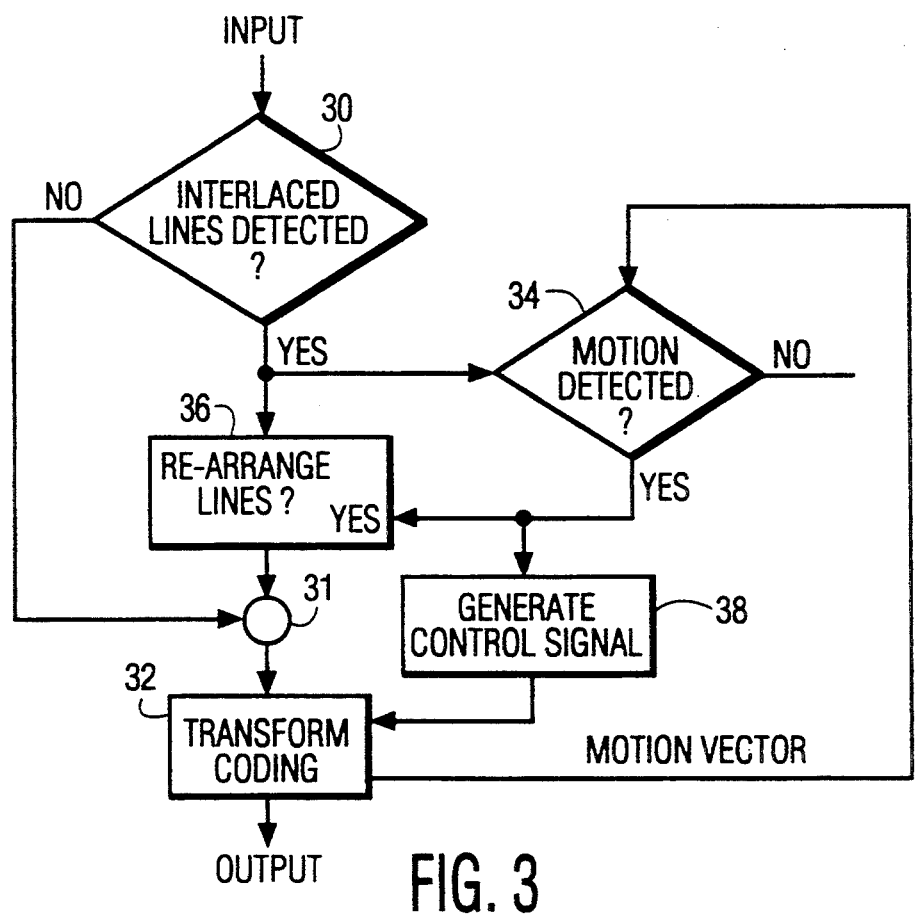
FIGS. 3 and 4 are flow diagrams respectively depicting encoder and decoder processing methods in accordance with the principles of the invention.

FIG. 3 is a flow chart illustrating a method as described above in accordance with the principles of the invention. In method step 30 an input signal is evaluated to determine if it exhibits interlaced or progressive scan form. A progressive scan signal is transformed and coded without further processing at step 32 via node 31. If an interlaced signal is detected at step 30, the interlaced signal is evaluated at step 34 to determine if it contains motion. If it does not, the interlaced signal is coupled via step 36 without rearranging its original line structure to step 32 where the interlaced signal is transformed and coded. If step 34 senses that the interlaced signal contains motion, the processing of step 36 is controlled so as to rearrange the line structure of the interlaced signal (as previously discussed). The interlaced signal with rearranged line structure is transformed and subsequently coded by step 32. In step 38 a control signal indicating a rearranged line structure when an interlaced signal with motion is detected is provided to the coding function in step 32. The coding function in step 32 may provide a motion vector to motion detection step 34 to indicate a motion condition for rearranging the line structure of an interlaced signal. Picture and block storage steps as may be required to facilitate the process illustrated by FIG. 3 have been discussed previously in connection with FIG. 2 and have not been shown to simplify FIG. 3.

Figure 4:
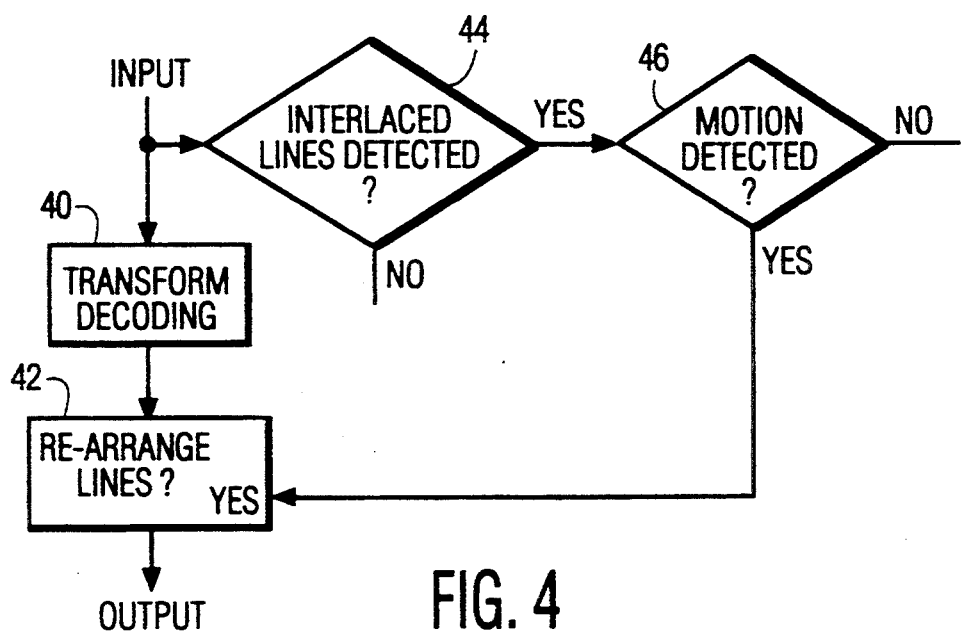

FIG. 4 is a flowchart illustrating decoder processing steps associated with the coding process discussed in connection with FIG. 3. An input signal transform coded as discussed previously is decoded and inverse transformed by step 40. Before being applied to an output, the decoded signal is processed by a step 42, which rearranges the line structure back to an original structure if the signal exhibits an interlaced line format with motion. For this purpose step 44 determines if the input signal exhibits an interlaced line structure. If it does, step 46 determines if the interlaced signal contains motion. If motion is detected, a control signal is provided to step 42 to effect rearranging of the lines of the interlaced signal back to an original structure.

We claim:

1. A method for coding a signal representing an image comprising picture element (pixel) blocks of predetermined size using a hybrid coder suitable for transforming blocks of scanned pixels, comprising the steps of:

transforming progressively scanned pixel blocks independent of dynamic image content;

for static images, transforming interlaced scanned pixel blocks with an original line structure; and for images with dynamic content, (a) rearranging the original line structure of an interlace scanned image signal so as to produce first and second vertically superimposed pixel blocks of similar predetermined size, said first block containing pixels associated with image lines of a first field, said second block containing pixels associated with image lines of an associated adjacent second field; and (b) transforming said first and second blocks.

2. A method according to claim 1, further comprising the step of:

generating a control signal indicating the occurrence of said rearranging of said line structure; and adding said control signal to a coded signal produced by transforming said first and second blocks, for each pair of transformed first and second blocks.

3. A method according to claim 1, comprising the further step of:

rearranging said line structure in response to an output signal from a motion detector.

4. A method according to claim 1, comprising the further step of:

rearranging said line structure in response to a motion vector generated by said hybrid coder.

5. A method according to claim 1, wherein said blocks are 8×8 pixel blocks.

6. A method according to claim 5, wherein said vertically superimposed blocks are arranged within a group of four blocks arranged in a square pattern, each block of said group comprising 8×8 luminance pixels.

7. A method according to claim 6, further comprising the step of:

generating, for each said group of four blocks, a control signal indicating the occurrence of said rearranging of said line structure; and adding said control signal to a coded signal produced by transforming said first and second blocks, for each pair of transformed first and second blocks.

8. A method for decoding a signal representing an image comprising picture element (pixel) blocks of predetermined size, said signal having been coded using a hybrid coder suitable for transforming blocks of scanned pixels, said coding comprising the steps of: (a) transforming progressively scanned pixel blocks independent of motion, (b) transforming interlaced scanned pixel blocks with an original line structure in the presence of a static image; (c) rearranging the original line structure of an interlace scanned image signal in the presence of motion so as to produce first and second vertically superimposed pixel blocks of similar predetermined size, said first block containing pixels associated with image lines of a first field, said second block containing pixels associated with image lines of an associated adjacent second field; and (d) transforming said first and second blocks in the presence of motion; said decoding method comprising the steps of:

inverse transforming progressively scanned pixel blocks independent of image motion;

inverse transforming said interlace scanned pixel blocks with an original line structure in the presence of a static image;

inverse transforming said first and second blocks in the presence of image motion; and rearranging said line structure of said interlace scanned image signal back to said original line structure after said inverse transforming in the presence of motion.

9. A decoding method according to claim 8 and further including the step of evaluating a control signal indicative of said rearranging of said line structure.

10. A method for decoding a signal representing an image comprising picture element (pixel) blocks of predetermined size, said decoding method comprising the steps of:

inverse transforming progressively scanned pixel blocks independent of dynamic image content;

for static images, inverse transforming interlace scanned pixel blocks with an original line structure; and for images with dynamic content, (a) inverse transforming first and second blocks of pixels of an interlaced scanned image, said first and second blocks being vertically superimposed pixel blocks of similar predetermined size, said first block containing pixels associated with image lines of a first field, said second block containing pixels associated with image lines of an associated adjacent second field; and (b) rearranging said line structure of said interlace scanned image signal back to said original line structure after said inverse transforming for images with dynamic content.

* * * * *

UNITED STATES PATENT AND TRADEMARK OFFICE
CERTIFICATE OF CORRECTION

PATENT NO. : 5,422,676
DATED : June 6, 1995
INVENTOR(S) : Carsten Herpel; Heinz-Werner Keesen It is certified that error appears in the above-identified patent and that said Letters Patent is hereby corrected as shown below:

TITLE PAGE: item [30],
Add under "Foreign Application Priority Data"

---Apr. 14, 1992  PCT/EP 92/00843---

Signed and Sealed this

Twenty-first Day of January, 1997

Attest:

BRUCE LEHMAN

*Attesting Officer*      *Commissioner of Patents and Trademarks*